(12) United States Patent  
Church

(10) Patent No.: US 7,588,269 B2  
(45) Date of Patent: Sep. 15, 2009

(54) Z-SHAPED THREAD FORM FOR TUBULAR CONNECTIONS

(75) Inventor: Kris L. Church, Montgomery, TX (US)

(73) Assignee: Gandy Technologies Corporation, Conroe, TX (US)

( * ) Notice: Subject to any disclaimer, the term of this patent is extended or adjusted under 35 U.S.C. 154(b) by 528 days.

(21) Appl. No.: 11/527,352

(22) Filed: Sep. 26, 2006

(65) Prior Publication Data

US 2008/0073909 A1    Mar. 27, 2008

(51) Int. Cl.
*F16L 25/00* (2006.01)
(52) U.S. Cl. .................. 285/334; 285/333; 285/390
(58) Field of Classification Search ............. 285/333, 285/334, 390
See application file for complete search history.

(56) References Cited

U.S. PATENT DOCUMENTS

| | | | | |
|---|---|---|---|---|
| 4,022,205 A | * | 5/1977 | Tenczar | 604/411 |
| 4,600,224 A | * | 7/1986 | Blose | 285/334 |
| 4,600,225 A | * | 7/1986 | Blose | 285/334 |
| 5,454,605 A | * | 10/1995 | Mott | 285/333 |
| 6,254,146 B1 | * | 7/2001 | Church | 285/334 |
| 6,722,706 B2 | * | 4/2004 | Church | 285/334 |
| 6,832,789 B2 | * | 12/2004 | Church | 285/333 |

\* cited by examiner

*Primary Examiner*—David E Bochna
(74) *Attorney, Agent, or Firm*—Charles D. Gunter, Jr.

(57) ABSTRACT

A thread form is shown which is used to make a threaded pipe connection capable of being screwed together and subsequently unscrewed. A pin is provided having external threads with stab flanks and load flanks and flat crests and roots for mating with the mating internal threads of a box to make up a pipe connection. The stab flanks and load flanks form complex geometric profiles which in one version form an inclined Z-shape in profile and in another version form a reverse inclined Z-shape profile. Each profile includes at least three separate facets with the facets on the stab flank and the facets on the load flank both leaning in the same direction with respect to the longitudinal axis of the pipe, when viewed in profile.

30 Claims, 4 Drawing Sheets

Z-SHAPED THREAD FORM FOR TUBULAR CONNECTIONS

BACKGROUND OF THE INVENTION

1. Field of the Invention

The present invention relates to a thread form for threaded connections of the type used for securing tubular flow conduits to form a desired continuous flow path.

2. Description of the Prior Art

A variety of threaded connections are known in the prior art for joining tubular flow conduits in an end-to-end relationship to form a continuous flow path for transporting fluid. Typical examples of such flow conduits include casing, expandable casing, tubing, drill pipe and risers for oil, gas, water and waste disposal wells, and in horizontal and trenchless drilling applications. In the case of oil field casing and tubing, it is a common practice to use metal pipes of a definite length, with sections of pipe joined to form a string. The string of pipes effectively creates one lengthier pipe, intended to provide a means to reach the depth at which the reservoirs of gas or oil are found in order for extraction to the surface.

The pipe sections are secured together at their ends by an externally threaded connector, or "pin" that is threadedly received within an internally threaded connector or "box". Each pipe section has a pin on one pipe end and a box at the opposite pipe end. Some pipe has an internally threaded coupling secured to one end of a double pin pipe section to produce the box. The individual pipe sections are frequently referred to as a "pipe joint". Tubing and casing pipe joints are usually 30 ft. in length but can vary in length from 20 ft. to 40 ft. or longer.

The various pipe strings used in constructing a well are usually assembled on the floor of a drilling or workover rig. The pipe string is lengthened and lowered into the well as succeeding pipe joints are added to the string. During this assembly procedure, the pipe joint being added to the string is lowered, pin down or pin up, into an upwardly or downwardly facing box projecting from the drilling rig floor. This procedure is commonly referred to as "stabbing" the pin into the box. After being stabbed, the added pipe joint is rotated to engage the threads of the pin and box, securing the joint to the string. The process is basically reversed in or to "destab" or disassemble the pipe string. Once free of the box, the removed joint is moved to a storage location.

There have been numerous advances in thread technology of the type under consideration in recent years. For example, Re. Pat. No. 30,647 issued to Blose in 1981 disclosed a tubular connection having a thread form which provided an unusually strong connection while controlling the stress and strain in the connected pin and box members of the connection. The thread form featured mating helical threads which were tapered in thread width in opposite directions to provide wedge-like engagement of the opposing flanks to limit rotational make-up of the connection. The wedge thread, if properly designed, provides high torsional resistance without inducing axial or radial stresses into the tubular connection upon make-up of the joint, making it easier to break out the joints if this becomes necessary. By reducing axial or radial stresses in the threaded connection, a sounder connection is theoretically provided which is able to withstand a greater level of operating stress and strain.

U.S. Pat. No. 4,600,224, issued Jul. 15, 1986 to Blose was a refinement and further improvement to the basic wedge thread concept. In the invention disclosed in the '224 patent, a connection was shown having a "chevron" load flank. Radial make-up of the threaded connection was controlled by the special thread structuring where the radial movement of a thread into a mating thread groove was restricted by a chevron type interfit between two load bearing thread surfaces of the threaded connection instead of relying upon thread width alone.

Re. Pat. No. 34,467 issued Dec. 7, 1992 to Reeves purported to be an improvement to the basic Blose wedge thread design. As explained by the patentee, when Blose's connection is rotatably made up to engage both the front and back thread load flanks, incompressible thread lubricant or other liquid may be trapped between the engaged load flanks. This trapped thread lubricant can resist the make-up torque and give a false torque indication that results in lower than desired stress and strain being induced in the Blose connection and reducing the design strength and load carrying capacity. The invention described in Re. Pat. No. 34,467 purports to preclude the possibility of false indication of torque by excluding thread lubricant from between the thread load flanks that are brought into engagement at make-up.

In Re. Pat. No. 30,647 and Re. Pat. No. 34,467, the preferred threads were "dovetailed-shaped" in cross section, being wider at the crests than at the roots. U.S. Pat. No. 4,600,224 was a departure from the Blose design in that a semi-dovetail or partial dovetail thread was disclosed. However, the thread crest width continued to be greater than the thread root width as in the traditional definition of the term "dovetail."

U.S. Pat. Nos. 6,254,146 and 6,722,706, to Kris L. Church, were directed to further improvements in thread forms of the type under consideration. The thread forms shown in these earlier Church patents include a special thread structuring where the radial movement of one thread into a mating thread groove is controlled by a complex profile interfit between the two mating thread surfaces of the threaded connection. The complex profile can be present on the stab flank, on the load flank, or on a combination of the two flanks. A controlled clearance is provided between the mating crests of the interengaged threads to prevent hydraulic pressure buildup caused by entrapped lubricant between the thread crests and roots. The stab flanks complex profile is preferably a multi-faceted flank having at least three facets and four radii per stab flank. The pin thread crests have a crest width and the pin roots have a root width. The width of the crest is less than the width of the roots, which is exactly opposite that of the general dovetail design.

Despite the improvements in thread form design discussed above, a need continues to exist for a thread form which is capable of coupling tubular pipe sections quickly and efficiently, which forms a secure connection, and which is economical to produce.

A need also exists for such a thread form which provides a more versatile design than existing designs and which achieves different purposes depending on the end application, such as providing a design that works more efficiently in compression, rather than tension, or more efficiently in tension rather than in compression.

A need also exists for an improved thread form for the coupling of tubular pipe sections that allows machining more threads per inch during manufacture, thereby providing shorter overall connections than were previously possible.

SUMMARY OF THE INVENTION

The present invention has as its object to provide a further modification of the basic thread forms discussed above which provides improved design characteristics and performance over the prior art.

The thread forms of the invention can be used for making a threaded pipe connection capable of being screwed together and subsequently unscrewed. The thread forms are used on a connection which includes a pin having external threads with stab flanks and load flanks and flat crests and roots for mating with the mating internal threads of a box to make up a pipe connection. The thread forms of the invention form a complex profile interfit between the two mating thread surfaces of the threaded connection. The complex profile is present on both the stab flank and the load flank of the threads making up the thread form. In the preferred form of the invention, the stab flanks and load flanks each forms an inclined Z-shape in profile, the Z-shape profile including at least three separate facets, and wherein the facets on the stab flank and the facets on the load flank both lean in the same direction with respect to a horizontal axis of the pipe, when viewed in profile. In one version of the thread form of the invention, the facets on the stab flank are all parallel to the facets on the load flanks, but the respective flanks can have facets which are non-parallel, as well.

The thread widths also have unique characteristics which give the thread forms of the invention more versatility than the designs of the prior art. In one version of the invention, the threads have a given thread height, the thread crests have a given width, and wherein the width at or near the thread crests is equal to the width measured at any point along the height of the thread. In another version of the present thread form design, the width of the threads at or near the thread crests is smaller than the width measured at any point along the height of the thread. In another version of the thread form design, the thread crests have a given width and wherein the width at or near the thread crests is greater than the width measured at any point along the height of the thread. In yet another version of the thread form of the invention, the threads have a given thread height and wherein the thread crests have a given width and wherein the width along the height of the thread varies, being both greater and smaller than the width measurements taken at the thread crest, depending upon the position at which the width measurements are taken. The thread forms can either be cylindrical threads, or can be tapered threads having a given angle of taper with respect to a longitudinal axis of the pipe. The threads can also be helically structured as a wedge.

In yet another version of the thread form of the invention, the stab flanks and load flanks each forms an inclined reverse Z-shape in profile, the reverse Z-shape profile including at least three separate facets, and wherein the facets on the stab flank and the facets on the load flank both lean in the same direction when viewed in profile. In the case of the reverse Z-shaped profile, the threads are formed with a positive sloped facet at the root of the load flank. This is in contrast to the regular Z-shaped profile in which the threads are formed with a negatively sloped facet which forms a hook at the base of the load flank. The two versions of the thread form also differ in that the regular Z-shaped profile, has two hooks on the load flank and one hook surface on the stab flank, providing improved performance in tension. The reverse Z-shaped profile has one hook surface on the load flank and two hook surfaces on the stab flank, providing improved performance in compression.

Additional objects, features and advantages will be apparent in the written description which follows.

DETAILED DESCRIPTION OF THE INVENTION

Figure 1:
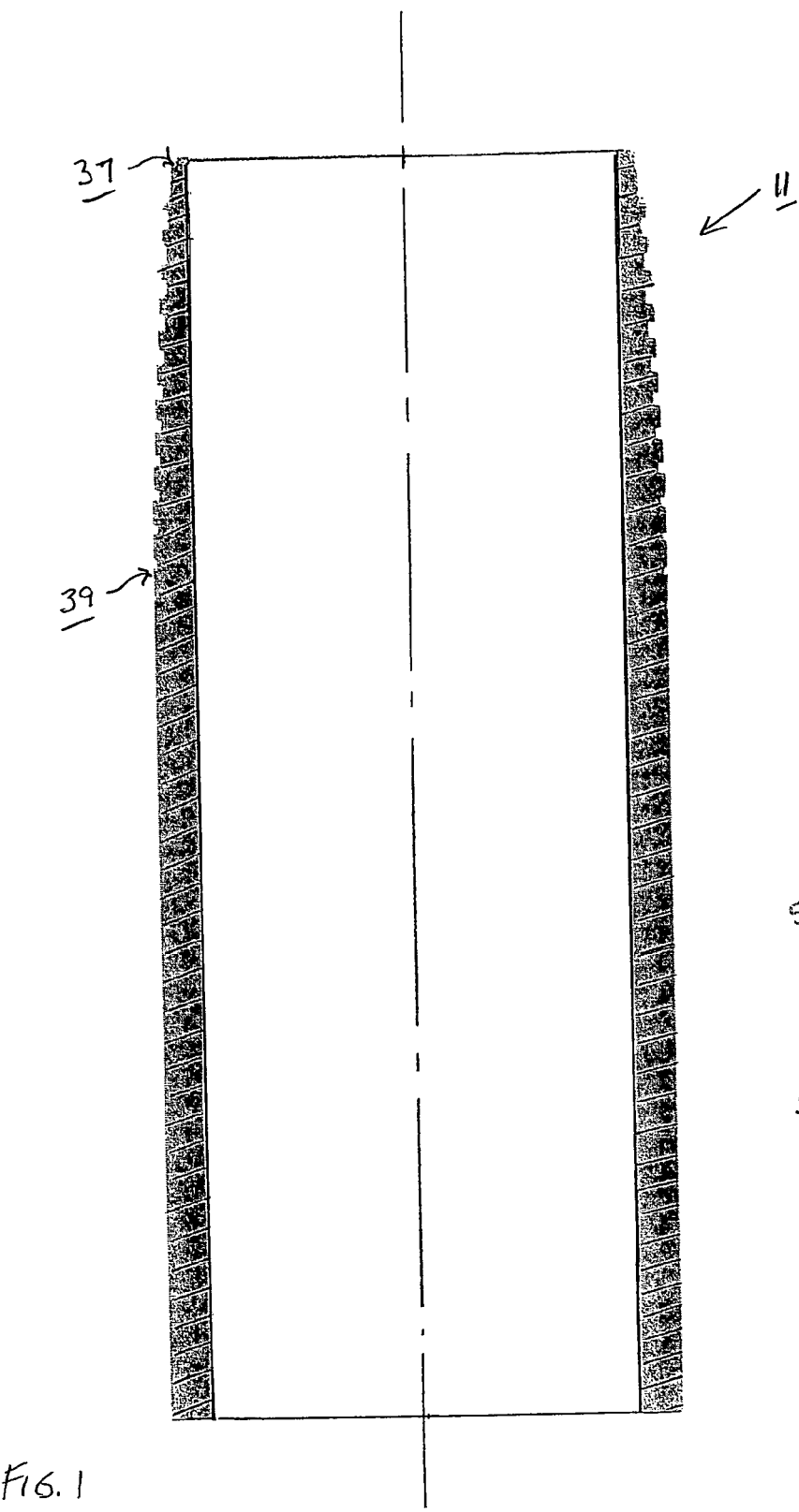
FIG. 1 is a side, cross-sectional view of the pin end of a section of pipe employing the thread form of the invention.

For simplicity sake, the invention will be described in terms of a section of oil field casing. Turning to FIG. 1 of the drawings, there is shown a cross sectional view of a pin end of a section of tubular pipe, such as a section of oil field casing, employing the thread form of the invention, the section of pipe being designed generally as 11. Although only the pin end of the connection is shown, it will be understood that the pin end is intended to be made up with a mating box end to form the pipe connection. As has been discussed, the thread forms of the invention can also be applied to a wide variety of tubular goods. Typical applications could include, but are not limited to, oil and gas offshore and onshore sub surface casing, intermediate casing, production casing, expandable casing, work over tubing, production tubing, tiebacks, risers, pile driving casing, line pipe, drill pipe, TNT pipe, flush joints, HDD pipe, water well pipe, liners for constructions, mining pipe, and disposal wells. Also, those skilled in the art will understand that the thread forms of the invention can be used in a variety of known types of pipe connections, including connections which are swaged, expanded, upset or non-upset and can be tapered or "cylindrical", non-tapered connections. The thread forms of the invention can also be used in connections which are helically structured as wedge threads such as those described in Blose Re. Pat. No. 30,647 and Reeves Re. Pat. No. 34,467.

Figure 2:
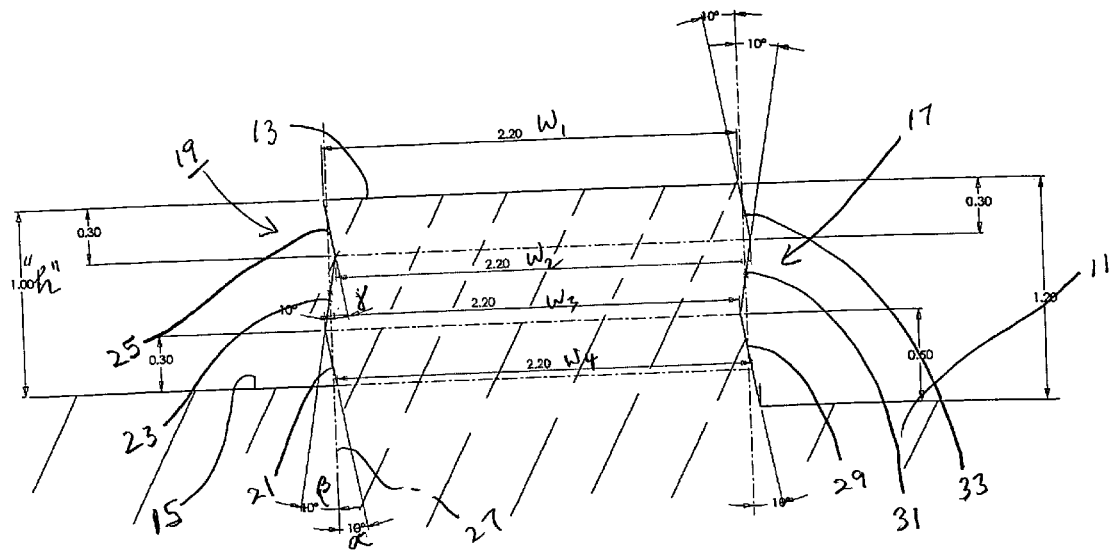
FIG. 2 is a partial, quarter-sectional view of one version of the pin thread form of the invention in which the thread width at or near the tooth crest is equal to the width along the height of the thread.

FIG. 2 shows one thread form of the invention in greater detail. As shown in FIG. 2, the pin end 11 of the tubular member has pin threads with thread crests 13 and thread roots 15. The crests 13 and roots 15 of the pin member 11 are adapted to be made up with a mating box member (not shown), having a complimentary thread structure. The box end is essentially a mirror image of the pin end. The pin thread crests 13 are formed between a stab flank 17 and a load flank 19 of the pin thread. The thread crests 13 are approximately parallel to the thread roots 15.

As used herein, the term "load flank" will be understood to designate that sidewall of a thread that faces away from the outer end from the respective male or female member on which the thread is formed, and the term "stab flank" will be understood to refer to that sidewall surface that faces toward the outer end of the respective male or female member. With respect to the thread shown in FIG. 2, the pin mouth or outer end would be located toward the right as viewed in FIG. 2.

Figure 1A:

As shown in FIG. 2, the stab flanks 17 and load flanks 19 of the thread form of the invention are each designed to form a complex profile interfit between the two mating thread surfaces of the pin end and box end of the threaded connection. The complex profile is present on both the stab flank 17 and the load flank 19 of the threads making up the thread form. In the preferred form of the invention illustrated in FIG. 2, the stab flanks 17 and load flanks 19 each forms an inclined Z-shape in profile, the Z-shape profile including at least three separate facets, i.e., facets 21, 23 and 25 for the load flank 19. The "Z-shape profile" of the load flank 19 is illustrated in exaggerated fashion in FIG. 1A of the drawings. It will be observed, with respect to FIG. 2, that the facet 21 forms a negative angle or "hook" with respect to the thread root 15 and to the horizontal axis of the pipe. By "negative" angle is meant that the angle formed between the facet 21 and the adjacent thread root surface 15 is an acute angle whereby the facet 21 flares or leans inwardly toward the thread root 15. In like fashion, the facet 23 forms a positive angle and the facet 25 again forms a negative angle with respect to the surface 15. In the embodiment of the invention illustrated in FIG. 2, the angle a is leaning negatively with respect to an imaginary line or axis 27 drawn perpendicular to the thread root surface 15. The angle β is leaning positively with respect to the line 27.

As will be appreciated with respect to FIG. 2, the facets 21, 23 and 25 on the load flank 19 are all inclined in the same direction as the corresponding facets 29, 31 and 33 on the stab flank 17. In other words, facets 21 and 29, facets 23 and 31 and facets 25 and 33 each lean in the same relative direction with respect to a horizontal axis of the pipe and to the thread roots 15, when viewed in profile. In one version of the thread form of the invention, the facets on the stab flank are all parallel to the corresponding facets on the load flanks, but the respective flanks can have facets which are non-parallel, as well, as long as they continue to lean in the same general direction. It should be noted that the unique multi-facet arrangement of the stab and load flanks of the thread form of the invention differs from, for example, a traditional "dovetail" thread. In the traditional dovetail thread, the stab and load flanks flare outwardly in opposite directions from the longitudinal axis of the pipe and from the thread roots. The thread crests of the traditional dovetail are also wider than the thread roots.

The threads of the invention have a given thread height, illustrated as "h" in FIG. 2 and a given width, illustrated as "w1", "w2", "w3" and "w4", depending upon the point along the thread height at which the measurement is taken. The thread widths of the threadform of the invention have unique characteristics which give the thread forms of the invention more versatility than the designs of the prior art. In the version of the invention illustrated in FIG. 2 the width "w1" at or near the thread crests is equal to the widths "w2", "w3" and "w4" measured at any point along the height of the thread.

Figure 3:
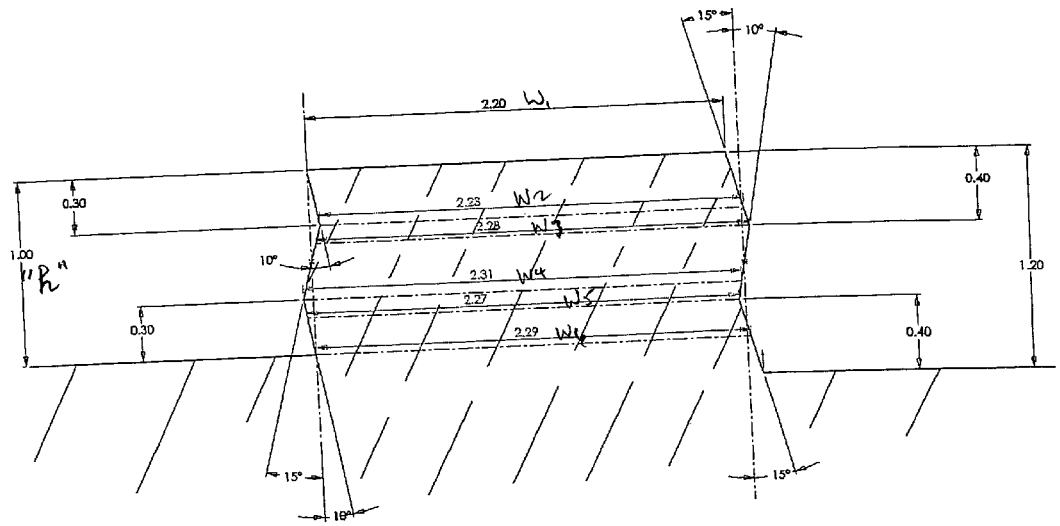
FIG. 3 is a view similar to FIG. 2, but showing another version of the pin thread form of the invention in which the thread width at or near the crest is smaller than the width along the height of the thread.

In another version of the present thread form design illustrated in FIG. 3, the width of the threads at or near the thread crests "w1" is smaller or less than the widths "w2", "w3", "w4", "w5" and "w6" measured at any point along the height of the thread.

Figure 4:
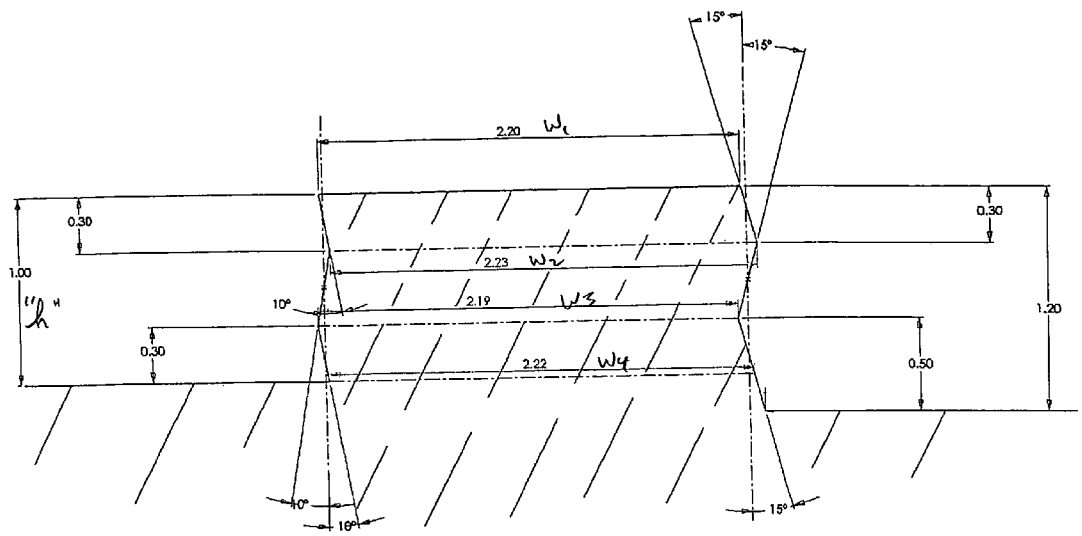
FIG. 4 is a view similar to FIG. 3, but showing another version of the pin thread form of the invention in which the thread width at or near the tooth crest is both larger and smaller than the width along the height of the thread.

In another version of the thread form of the invention illustrated in FIG. 4, the threads have a given thread height "h" and varying thread widths, wherein the thread crests have a given width "w1" and wherein the width along the height of the thread, "w2", "w3", "w4", varies being both greater and smaller than the width measurements taken at the thread crest, depending upon the position at which the width measurements are taken.

Figure 5:
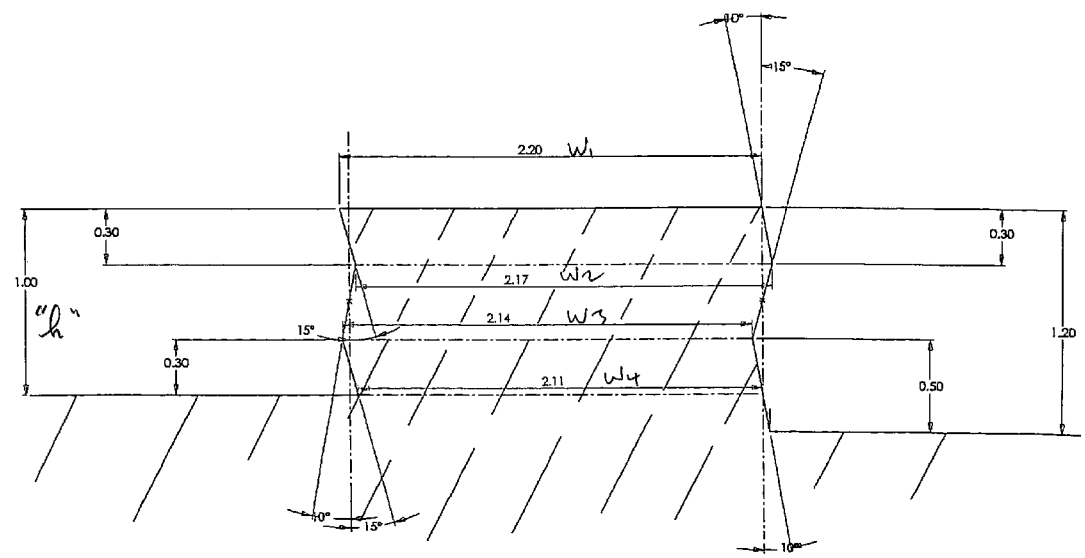
FIG. 5 is a view similar to FIG. 4, but showing another version of the pin thread form of the invention in which the tooth width at or near the crest is larger than the width along the height of the thread.

In yet another version of the thread form design illustrated in FIG. 5, the thread crests have a given width "w1" and wherein the width at or near the thread crests is greater than the widths "w2", "w3" and "w4" measured at any point along the height of the thread.

Figure 6:
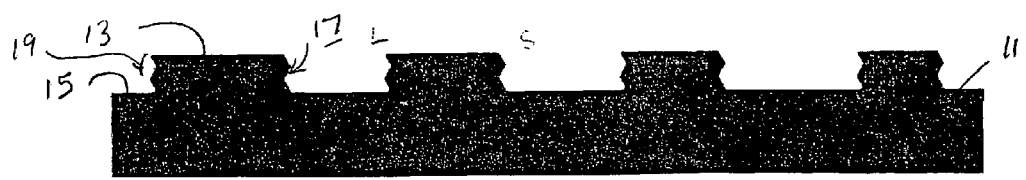
FIG. 6 is a partial, quarter-sectional view of one version of the thread form of the invention in which the threads are cylindrical with respect to the longitudinal axis of the pipe.
Figure 8:
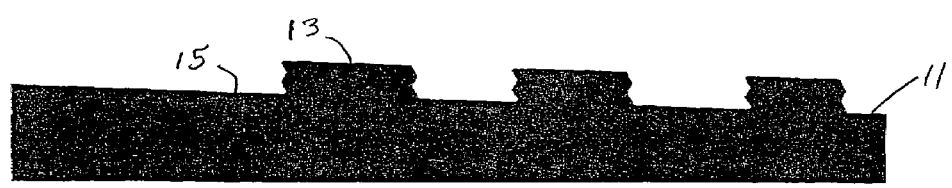
FIG. 8 is a view similar to FIG. 6, but showing another version of the thread form of the invention in which the threads are tapered with respect to the longitudinal axis of the pipe.
Figure 1:
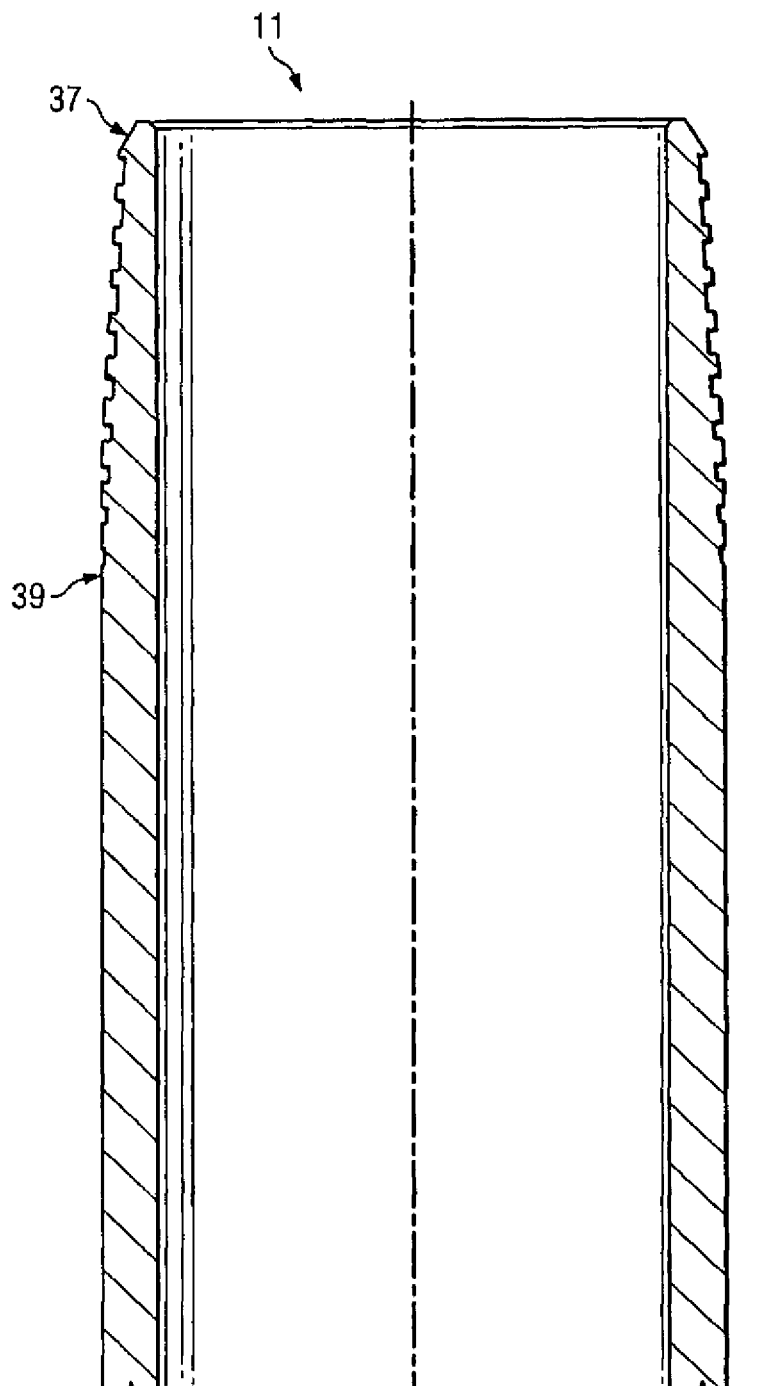
Figure 1A:
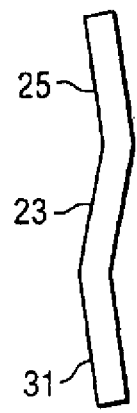
Figure 1B:
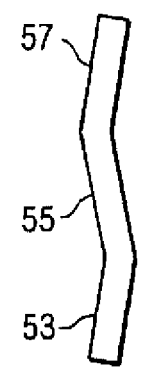
Figure 2:
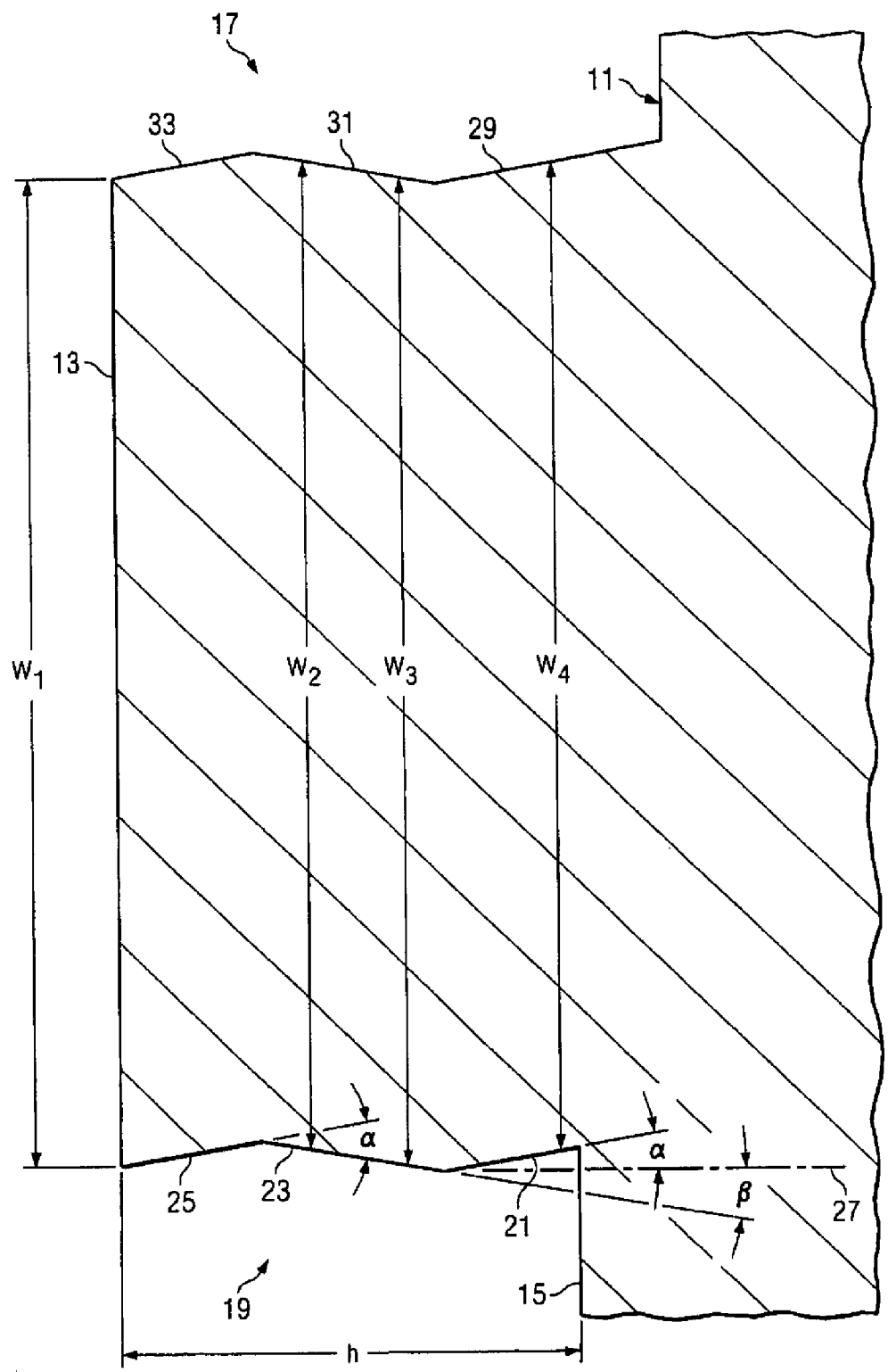
Figure 3:
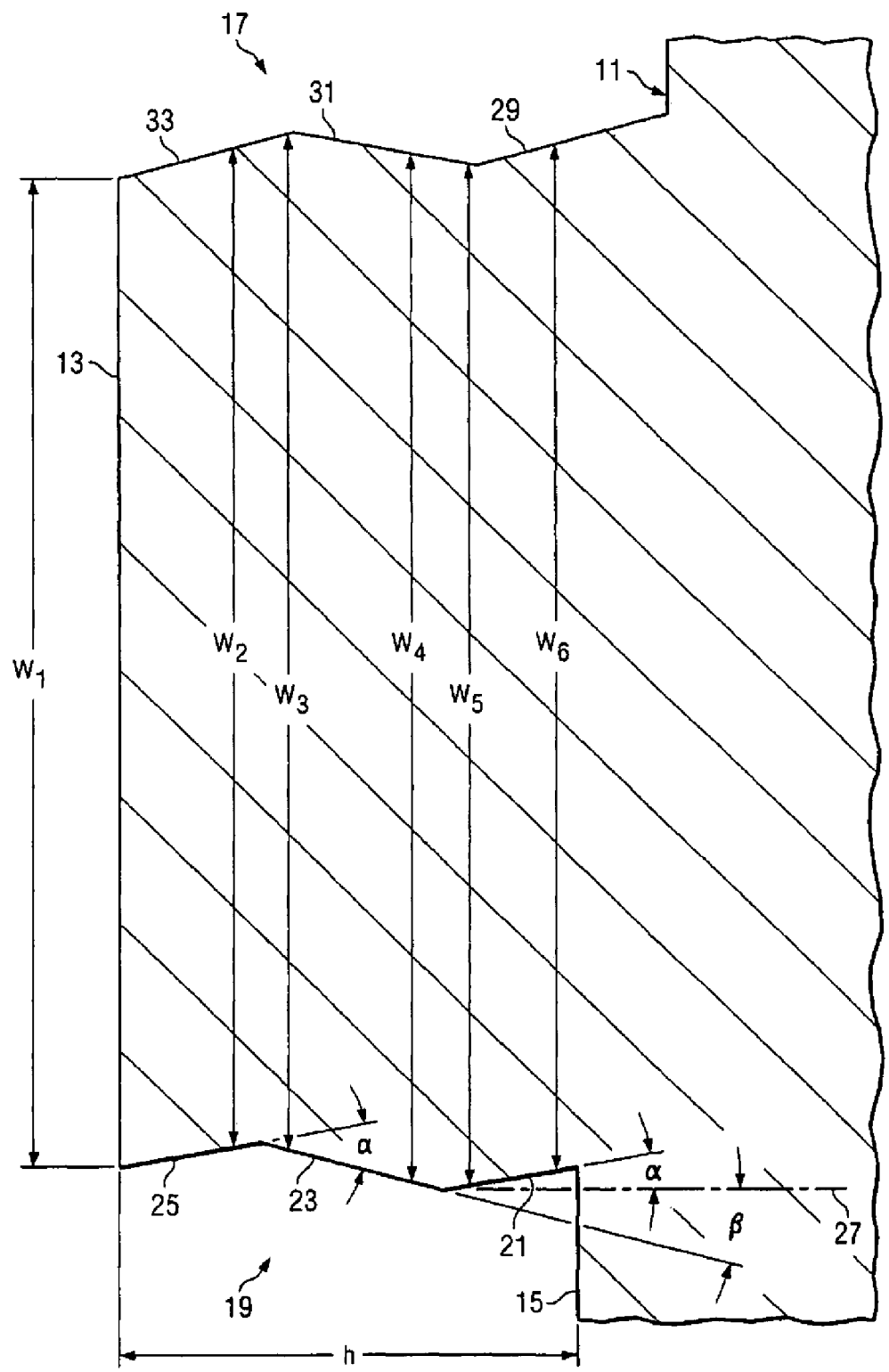
Figure 4:
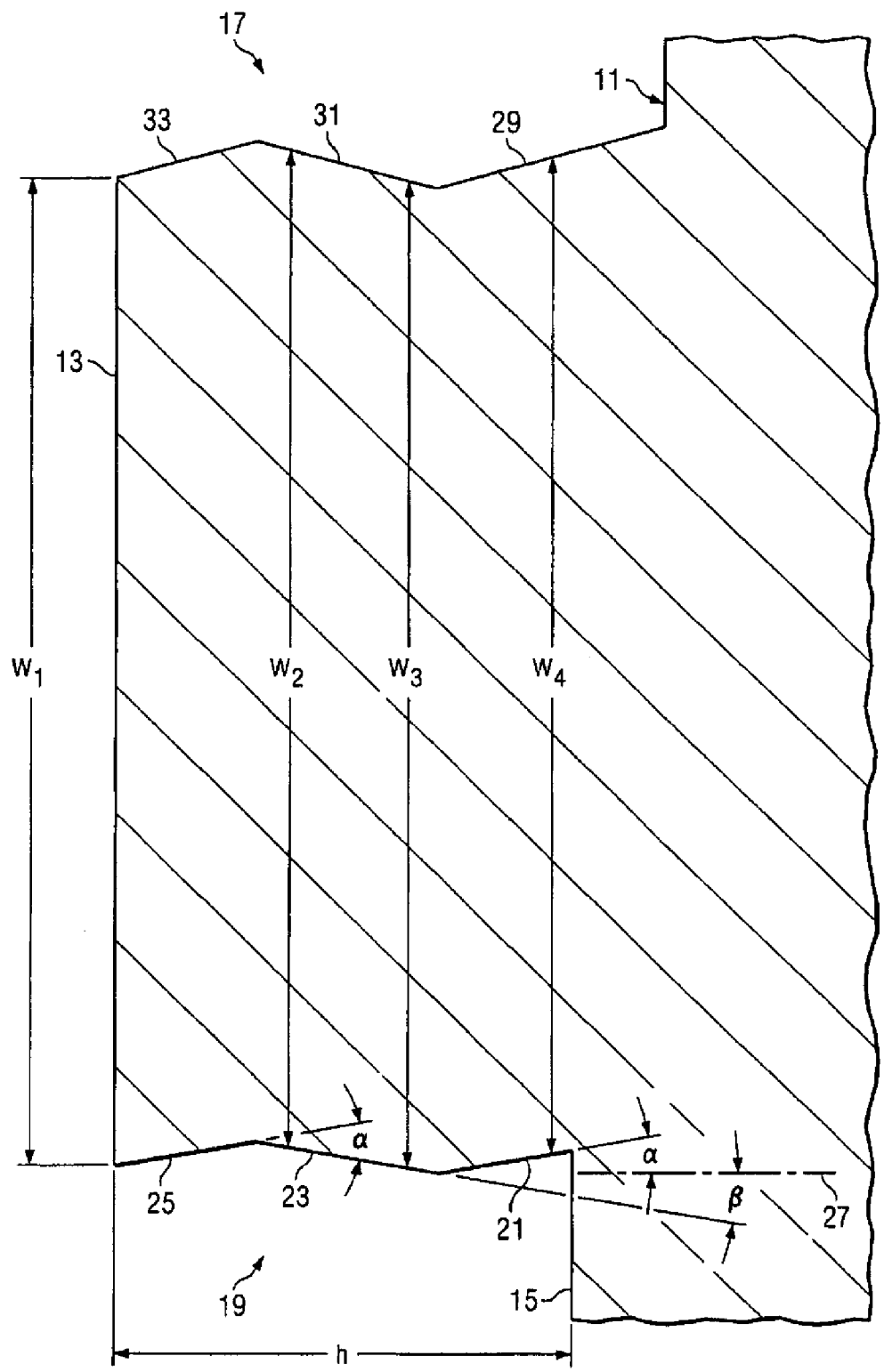
Figure 5:
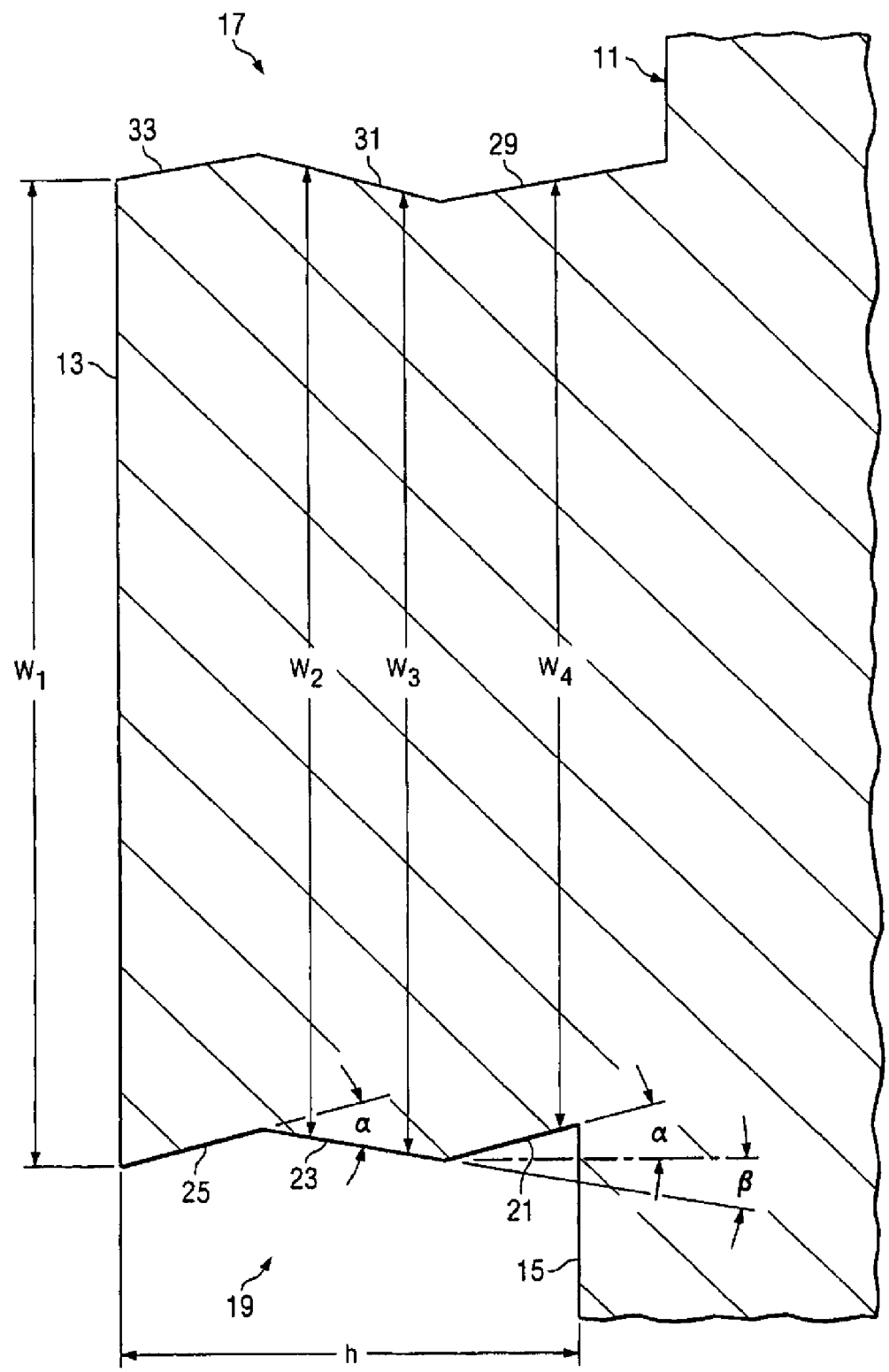
Figure 6:
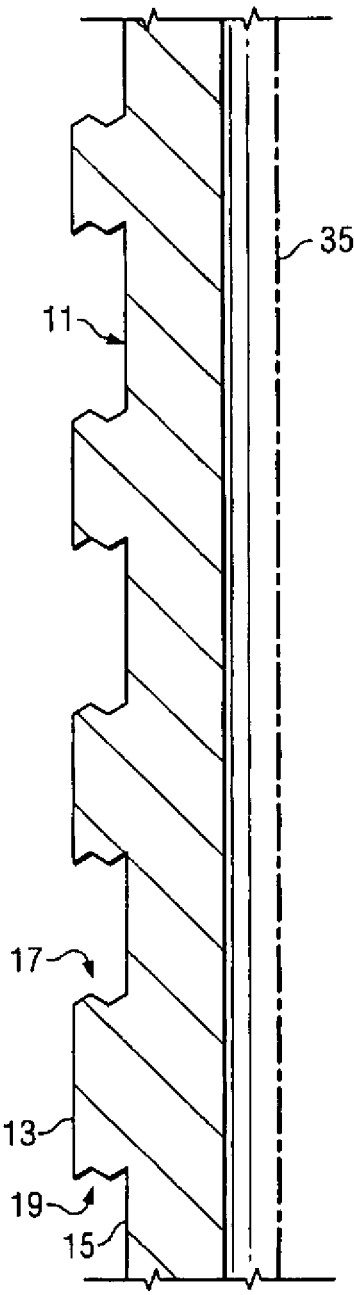
Figure 7:
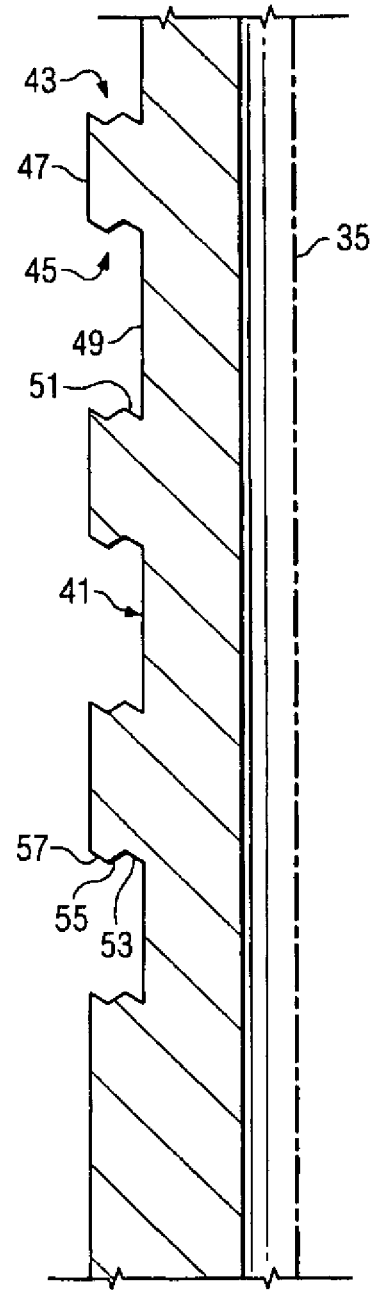
Figure 8:
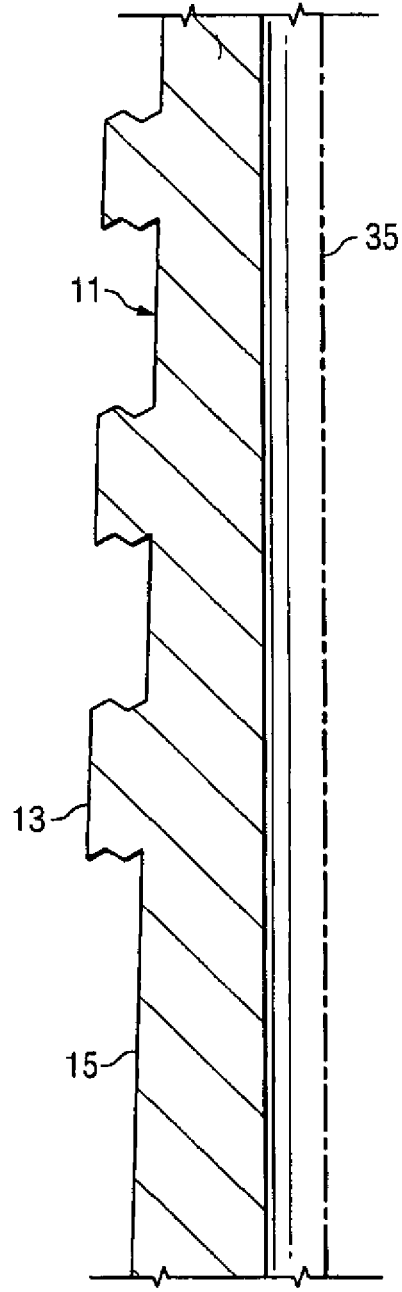
Figure 1:
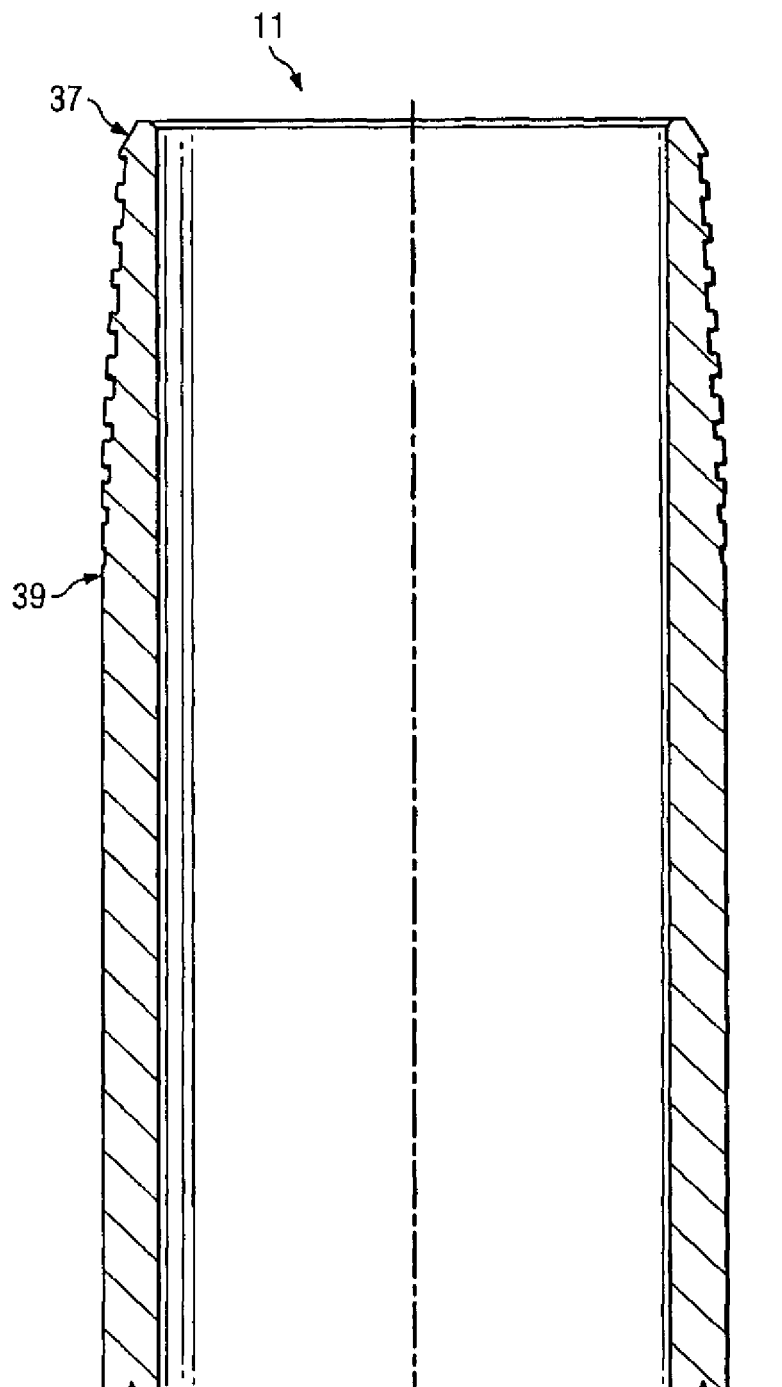
Figure 1A:
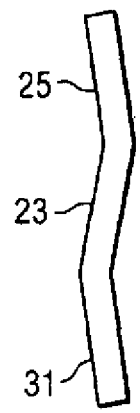
Figure 1B:
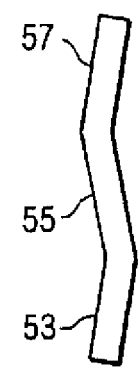
Figure 2:
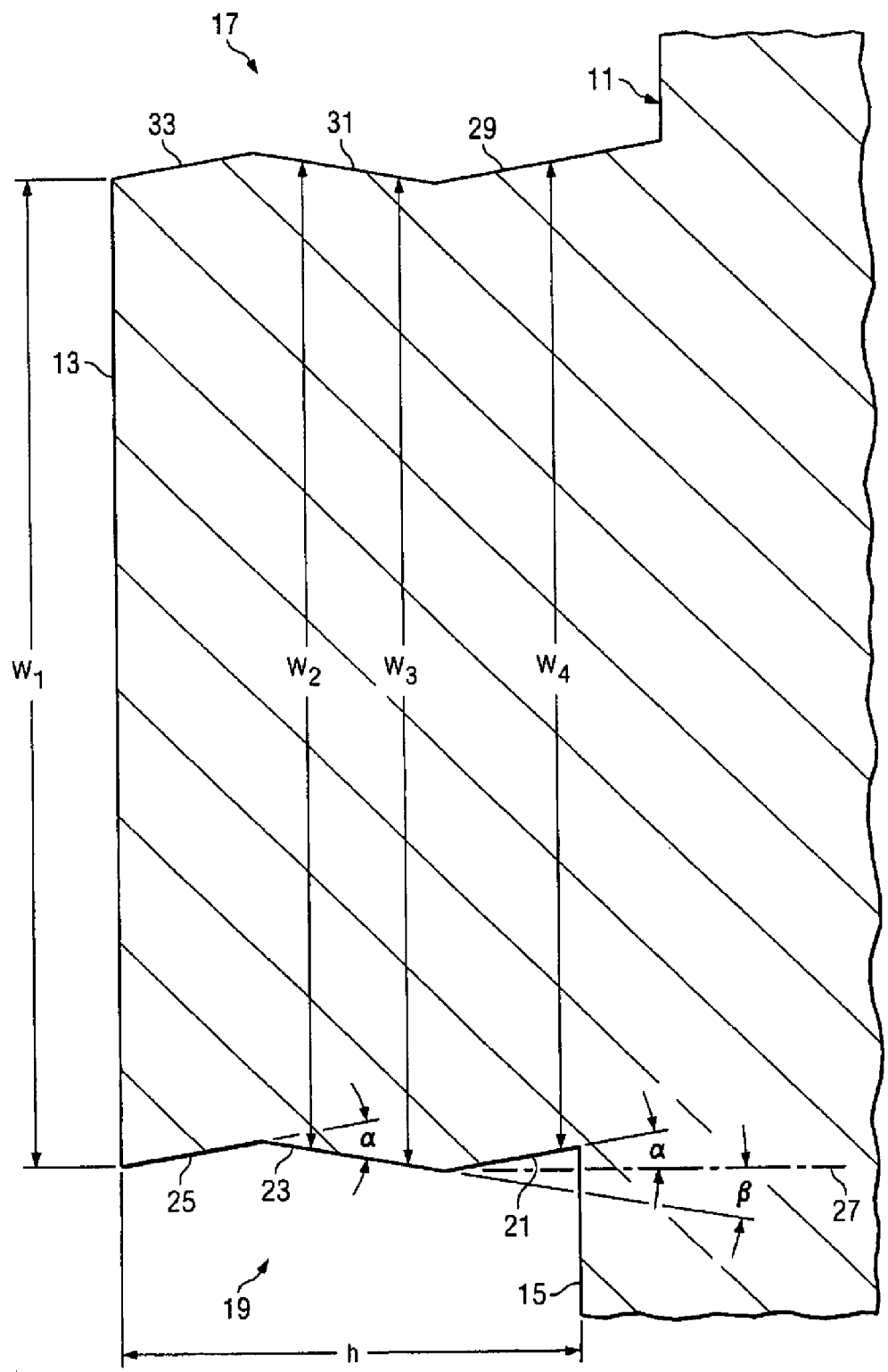
Figure 3:
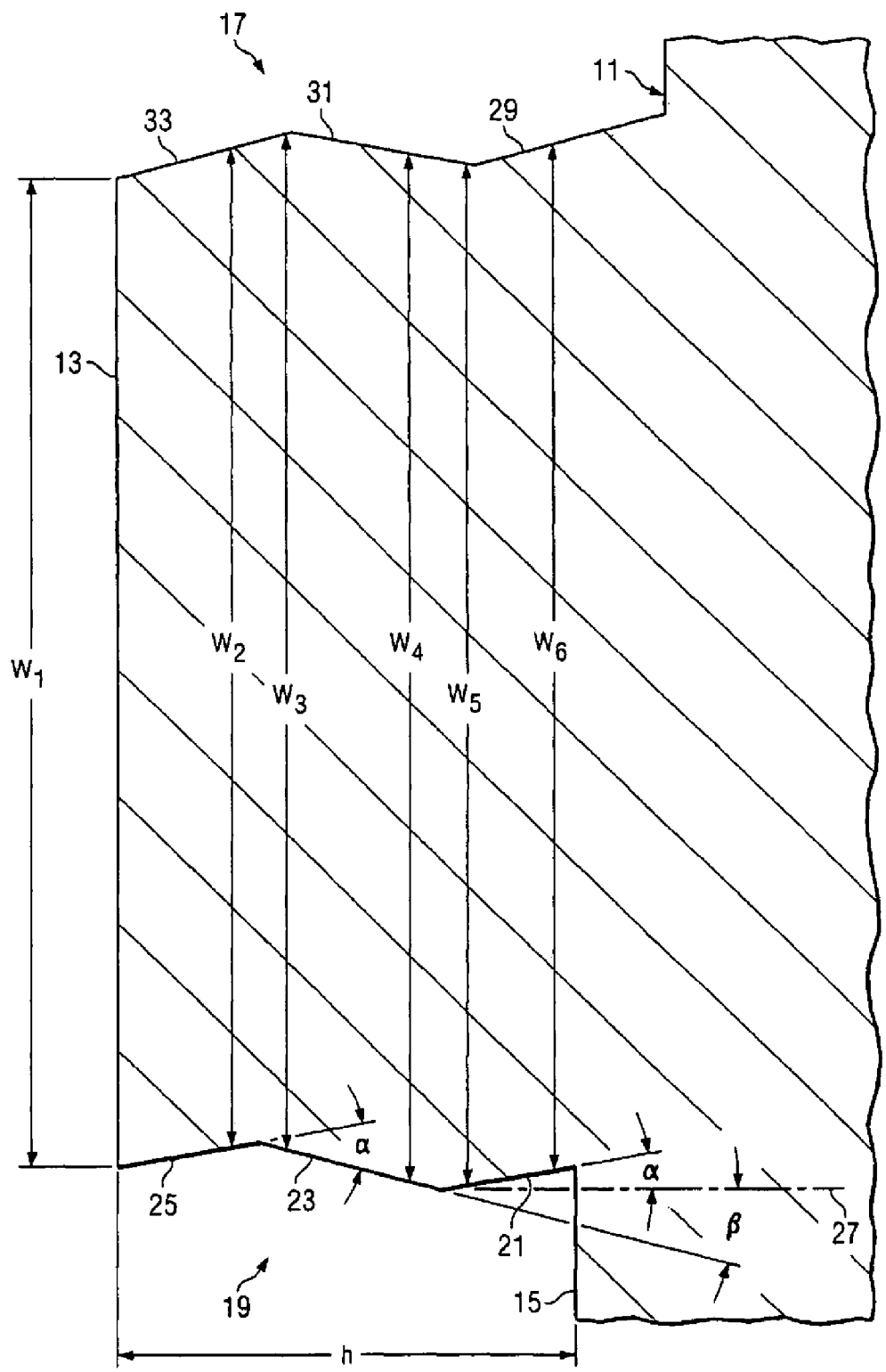
Figure 4:
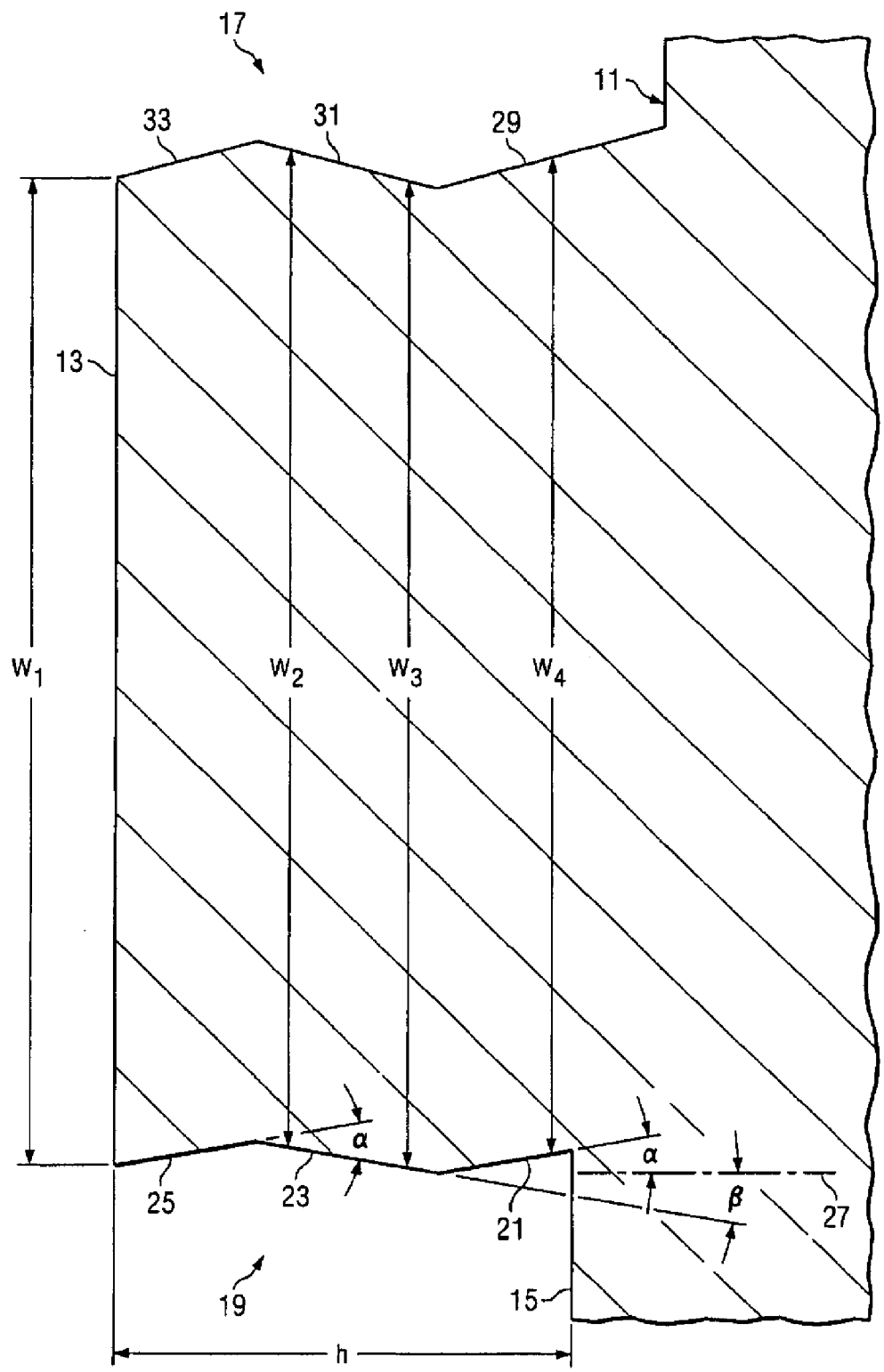
Figure 5:
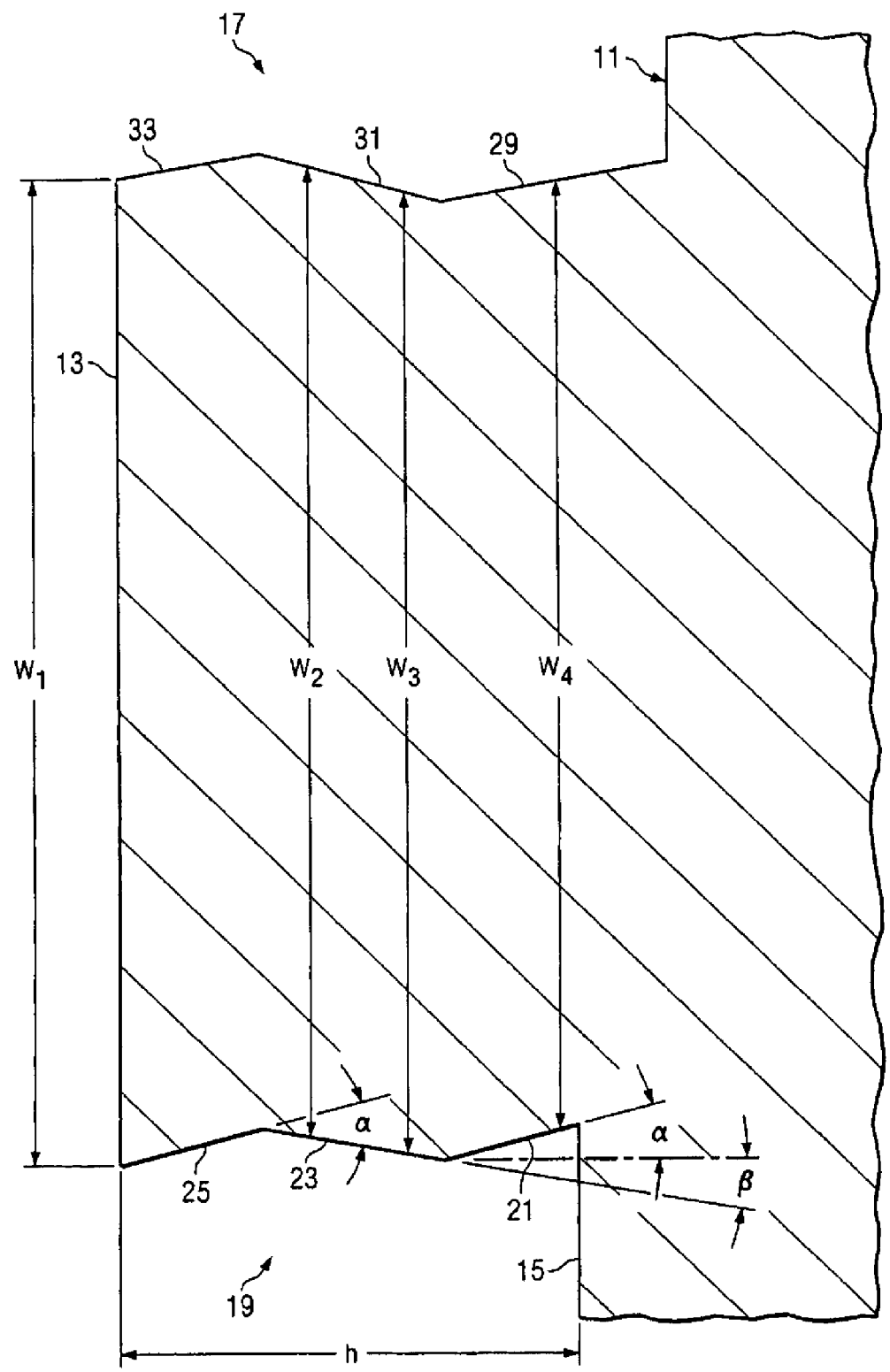
Figure 6:
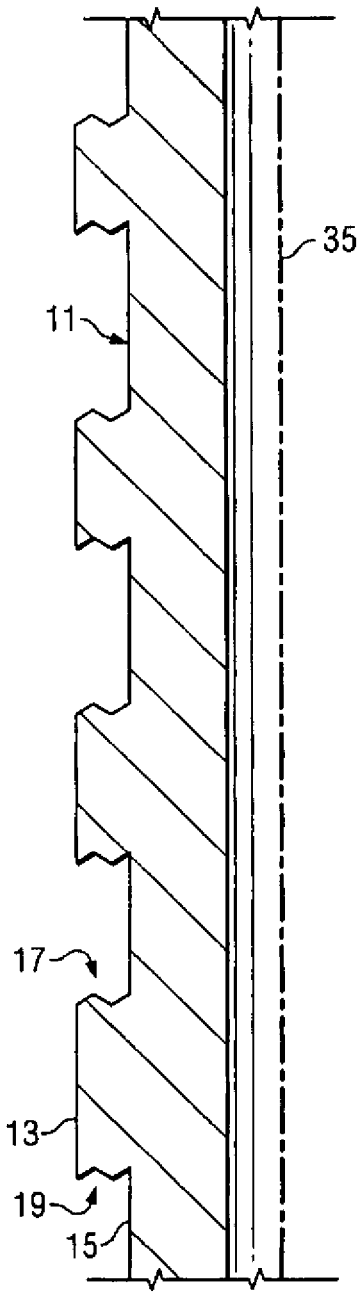
Figure 7:
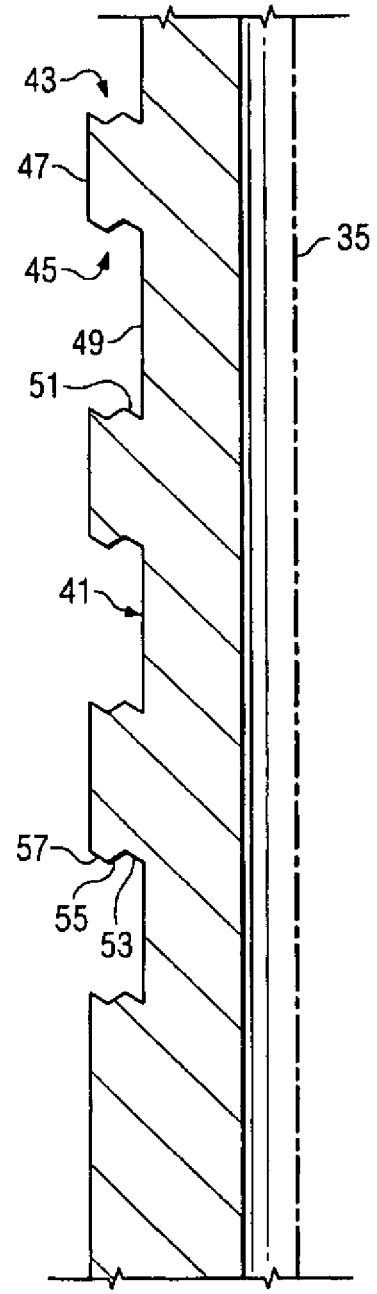
Figure 8:
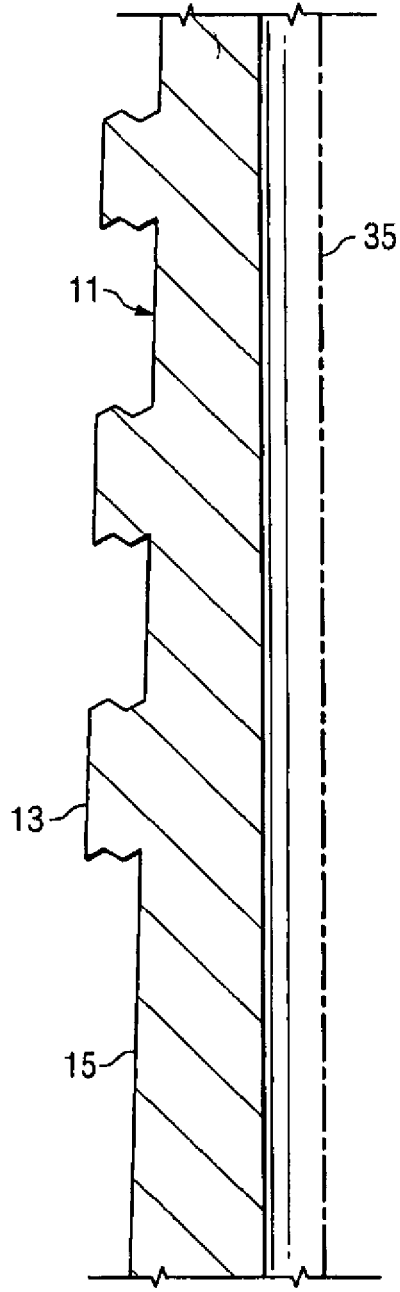

As was briefly mentioned, the thread forms of the invention can either be cylindrical threads, or can be tapered threads having a given angle of taper with respect to a longitudinal axis of the pipe. FIG. 6 of the drawings illustrates a pin end 11 having thread crests 13 and roots 15 which are parallel to the longitudinal axis 35 of the pipe. In similar fashion, FIG. 8 illustrates a pin end 11 having crests 13 and roots 15 which are tapered with respect to the pipe longitudinal axis 35.

In some cases, the thread forms of the invention can be helically structured as a wedge. In other words, both the pin and box threads are machined as helical wedge threads and thus have progressively changing axial width along the helical length thereof. In other words, with reference to FIG. 1, the threads on the pin member 11 could be machined so that the thread width of each successive thread progressively decreases from the inner extent 39 of the pin member along the helical length thereof to the outer extent 37 adjacent the mouth of the pin member. The axial thread width of the box member would progressively decrease in the opposite direction. The progressively changing axial width of the pin and box threads provides a wedging interfit to limit axial make-up of the tubular connection. Further details of "wedge" thread forms can be gained from the previously referenced Re. Pat. No. 30,647 issued to Blose in 1981, and similar references which will be familiar to those skilled in the art of thread form design.

Figure 1B:

FIG. 7 of the drawings illustrates another version of the thread form of the invention, which will be referred to herein as the "reverse Z-shape profile." The thread form shown in FIG. 7 is again a pin member 41 having external threads with stab flanks 43 and load flanks 45 and flat crests 47 and roots 49 for mating with the mating internal threads of a box to make up a pipe connection. In the form of the invention illustrated in FIG. 7, however, the stab flanks 43 and load flanks 45 each forms an "inclined reverse Z-shape" in profile. In other words, with reference to FIG. 1B, the reverse Z-shape profile is essentially the opposite or mirror image of the regular Z-shaped profile which has been discussed up to this point. However, in common with the first form of the invention, the "reverse Z-shape profile of FIG. 7 also includes at least three separate facets, such as facets 53, 55, 57, and the facets on the stab flank and the corresponding facets on the load flank both lean in the same direction when viewed in profile. The thread form of FIG. 7 differs from the regular Z-shaped profile of FIG. 6 in that the threads are formed with a negatively sloped facet 51 at the root of the stab flank 43.

Figure 7:
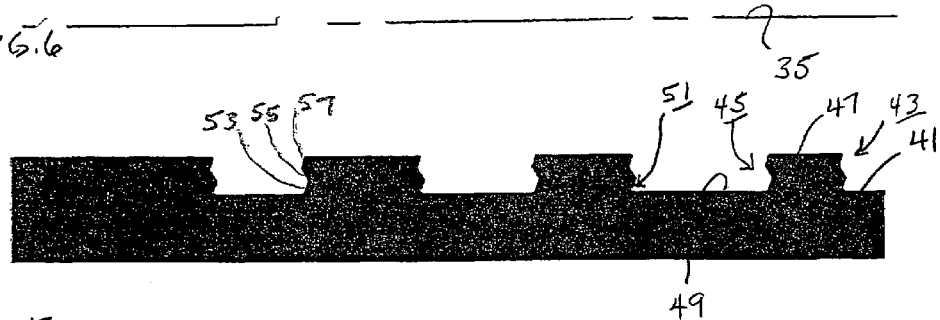
FIG. 7 is another partial, quarter-sectional view of one version of the thread form of the invention showing a positive load flank at the base of the thread, the threads being machined cylindrically with respect to the longitudinal axis of the pipe.

The differing designs illustrated in FIGS. 6 and 7 have different advantages, depending upon the end application. The Z-shape profile illustrated in FIG. 6 has, in effect, two hooks on the load flank 19 and one hook on the stab flank 17, giving it better performance characteristics in tension. Conversely, the reverse Z-shape profile illustrated in FIG. 7 has one hook on the load flank and two hooks on the stab flank, providing improved performance in compression. The regular Z-shape profile might be used most advantageously in oil field casing and tubing applications where the pipes are typically in tension. The reverse Z-shape profile might be used more advantageously in such applications as horizontal or trenchless drilling where the pipe string is being "pushed" and is therefore in compression.

The Z-shape profile of the invention also has application for use in the so-called "expanded casing" applications which have come into fairly wide spread use in recent years. Expanded casing is used in some well construction operations where it is found to be advantageous to radially plastically expand threaded pipe or casing joints in a drilled open hole or inside a cased wellbore. In a cased wellbore, radially expandable casing can be used to reinforce worn or damaged casing so as to, for example, increase a burst rating of the old casing, thereby preventing premature abandonment of the hole. In open hole sections of the wellbore, the use of radially expandable casing may reduce a required diameter of a drilled hole for a desired final cased hole diameter, and may also reduce a required volume of cement required to fix the casing in wellbore.

In conventional oilfield, water and waste disposal drilling, casing strings are installed at intervals whereby the casing for the next interval is installed through the casing for the previous interval. As a result, the outer diameter of a casing string is limited by the inner diameter of the previously installed casing string. Thus the casing strings in a conventional wellbore are nested relative to each other, with casing diameters decreasing in a downward direction. An annular space is typically provided between each string of casing and the wellbore so that cement may be pumped into the annular space or annulus to seal between the casing and the wellbore.

Because of the nested arrangement of the casing strings in a conventional wellbore, and the annular space required around the casing strings for cement, the hole diameter required at the top of the wellbore is relatively large. This large initial wellbore diameter may lead to increased costs due to the expense of large diameter casing, the expense of drilling large diameter holes, and the added expense of cementing a large casing string. Additionally, the nested arrangement of the casing strings in a conventional wellbore can severely limit the inner diameter of the final casing string at the bottom of the wellbore, which restricts the potential production rate of the well.

Thus, it may be desirable to radially expand a casing string "in situ" after it has been run into the wellbore through the previous casing string, so as to minimize the reduction of inner diameter of the final casing string at the bottom of the wellbore. Radially expanding a casing string in the wellbore has the added benefit of reducing the annular space between the drilled wellbore and the casing string, which reduces the amount of cement required to effect a seal between the casing and the wellbore.

The radial expansion can be achieved by a cold-forming expansion process in which an expansion tool or "pig" is moved through a casing string so as to radially plastically expand the casing string. One common prior-art expansion process uses a conically tapered, cold-forming expansion tool to expand casing in a wellbore. The expansion tool is generally attached to a lower end of a casing string that is run into the wellbore. The expansion tool also includes a cylindrical section having a diameter typically corresponding to a desired expanded inner diameter of a casing string. The cylindrical section is followed by a tapered section. After the casing string is set in place in the hole, an axial upward lifting force is exerted on the working string to force the expansion tool upward through the casing string so as to outwardly radial displace the casing string to a desired expanded diameter.

It will be appreciated from the foregoing that the threadforms utilized in expanded casing operations must be capable of securely joining the casing string and maintaining the integrity of the string so that the expansion operation does not significantly weaken the load carrying capacity of the threaded connection. During the expansion process, axial strains in standard prior art connections can cause the connection to fail. Alternatively, the efficiency of the connection (commonly defined as the ratio of a mechanical property of the pipe body, such as axial tension capacity, to the same mechanical property across the connection) may drop severely after casing expansion. The pipe body wall thickness is also generally reduced during the expansion process, thus reducing the mechanical properties of the pipe body itself. The improved Z-shaped thread profiles of the invention are ideally suited for use in expanded casing operations of the type described.

The assembly of a typical connection will be briefly discussed with respect to FIGS. 1 and 2 of the drawings. As has been explained, assembly of the pipe string normally involves a pipe joint being added to the existing string by lowering a section of pipe pin end down, into an upwardly facing box projecting from the drilling rig floor. After being stabbed into position, the added pipe joint ir rotated to engage the threads of the pin and box, thereby securing the joint to the pipe string. The connections of the invention are generally freerunning with the respective thread roots and crests, i.e., 13, 15 in FIG. 2, first making contact. Next in the order of assembly, the facet surfaces 25 and 31 make contact with their respective counterparts in the box end. Finally, the facet surfaces 21 and 33 make contact with their respective counterpart surfaces in the box end of the connection.

An invention has been provided with several advantages. Axial make-up of the threaded connection of the invention can be controlled by properly designing the complex profile engagement surfaces of the threads themselves. Radial make-up can be controlled by the special thread structuring where the radial movement of the thread making up into a mating thread groove will be restricted by a complex profile on both the stab flank and load flanks. By controlling the radial interfit between mating threads, lubricant entrapment can be controlled. The multi-faceted complex profiles of the load and stab flanks causes balanced stresses when the threads are made up. The thread forms of the invention provide greater versatility in design than did the designs of the prior art. In some forms, the thread form works best in tension. In other forms, the thread form works best in compression. Because the thread forms of the invention can be provided with a steeper taper, the overall length of the connection can be shortened. In other words, the present designs may allow, for example, a six threads per inch of connection, where the prior art only allowed three threads per inch. Also, the steeper the taper generally, the better the stabbing characteristics of the pin end. The tendency toward "pointing" during stabbing operations is decreased. The designs of the invention allow the production of a shorter angle "wedge", presenting the possibility of the shortest wedge thread design ever produced.

While the invention has been shown in several of its forms, it is not thus limited, but is susceptibly to various modifications without departing from the spirit thereof.

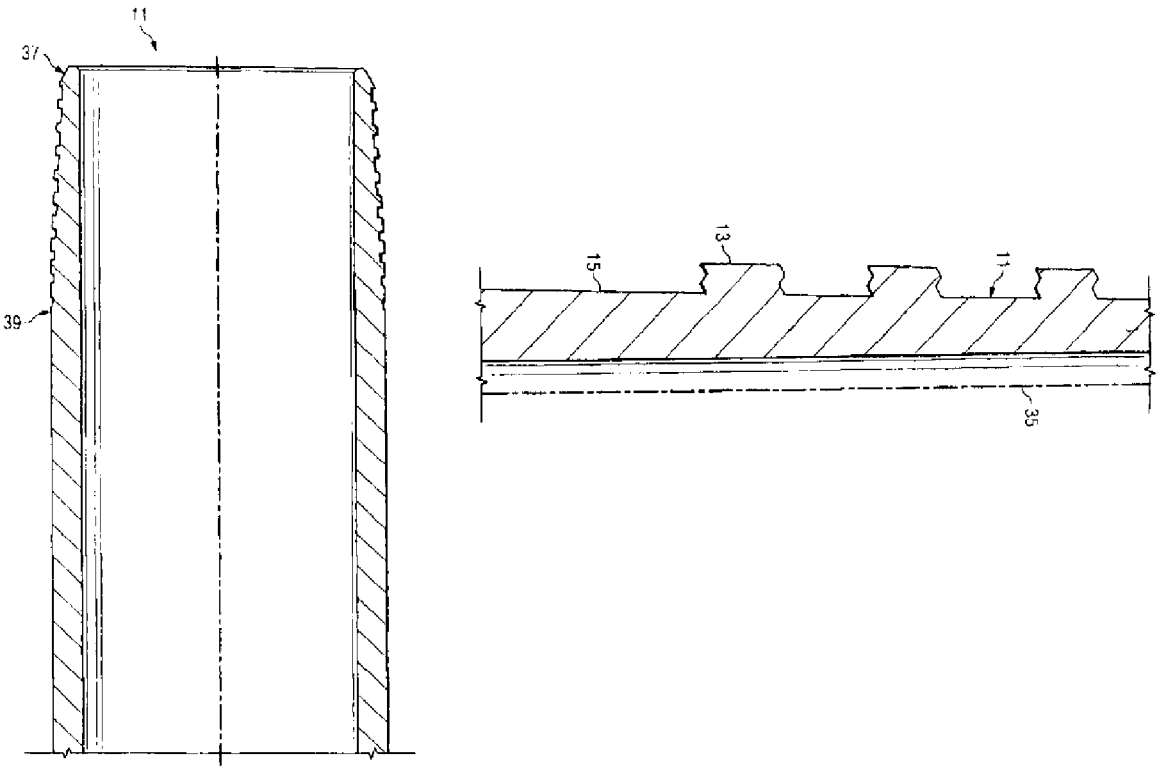

What is claimed is:

1. A thread form for making a threaded pipe connection capable of being screwed together and subsequently unscrewed, the thread form comprising:
   a pin having external threads with stab flanks and load flanks and flat crests and roots for mating with the mating internal threads of a box to make up a pipe connection, and wherein the stab flanks and load flanks each forms an inclined z-shape in profile, the z-shape profile including at least three separate facets with corresponding facets being present on the stab and load flanks, and wherein the facets on the stab flank and the corresponding facets on the load flank both lean in the same direction when viewed in profile.

2. The thread form of claim 1, wherein the facets on the stab flank are all parallel to the facets on the load flank of the pin threads.

3. The thread form of claim 1, wherein the threads have a given thread height and wherein the thread crests have a given width and wherein the width at or near the thread crests is equal to the width measured at any point along the height of the thread.

4. The thread form of claim 3, wherein the width of the thread being constant along the height thereof allows more threads per inch to be machined on the pin, thereby allowing shorter overall length connections to be manufactured.

5. The thread form of claim 1, wherein the threads have a given thread height and wherein the thread crests have a given width and wherein the width at or near the thread crests is smaller than the width measured at any point along the height of the thread.

6. The thread form of claim 1, wherein the threads have a given thread height and wherein the thread crests have a given width and wherein the width along the height of the thread varies, begin both greater and smaller than the width measurements taken at the thread crest, depending upon the position at which the width measurement is taken.

7. The thread form of claim 1, wherein the threads have a given thread height and wherein the thread crests have a given width and wherein the width at or near the thread crests is greater than the width measured at any point along the height of the thread.

8. The thread form of claim 1, wherein the threads are cylindrical threads.

9. The thread form of claim 1, wherein the threads are tapered threads having a given angle of taper with respect to a longitudinal axis of the pipe, and wherein the thread crests are parallel to the thread angle of taper.

10. The thread form of claim 1, wherein the threads are tapered threads having a given angle of taper with respect to a longitudinal axis of the pipe and wherein the thread roots and crests are parallel to the longitudinal axis of the pipe.

11. The thread form of claim 1, wherein the threads are formed with a negatively sloped facet which forms a hook at the base of the load flank.

12. The thread form of claim 11, wherein the thread facets form two hooks on the load flank and one hook on the stab flank, thereby providing improved performance in tension.

13. The thread form of claim 1, wherein the threads are helically structured as a wedge.

14. The thread form of claim 1, wherein the connection is used with a tubular selected from the group consisting of oil, gas, construction, water and waste disposal well casing and tubing.

15. A thread form for making a threaded connection capable of being screwed together and subsequently unscrewed, the thread form comprising:
a pin having external threads with stab flanks and load flanks and flat crest and roots for mating with the mating internal threads of a box to make up a pipe connection, and wherein the stab flanks and load flanks each forms an inclined reverse z-shape in profile, the reverse z-shape profile including at least three separate facets with corresponding facets being present on the stab and load flanks, and wherein the facets on the stab flank and the corresponding facets on the load flank both lean in the same direction when viewed in profile.

16. The thread form of claim 15, wherein the facets on the stab flank are all parallel to the facets on the load flank of the pin threads.

17. The thread form of claim 15, wherein the threads have a given thread height and wherein the thread crests have a given width and wherein the width at or near the thread crests is equal to the width measured at any point along the height of the thread.

18. The thread form of claim 17, wherein the width of the thread being constant along the height thereof allows more threads per inch to be machined on the pin, thereby allowing sorter overall length connections to be manufactured.

19. The thread form of claim 15, wherein the threads have a given thread height and wherein the thread crest have a given width and wherein the width at or near the thread crests is smaller than the width measured at any point along the height of the thread.

20. The thread form of claim 15, wherein the threads have a given thread height and wherein the thread crest have a given width and wherein the width along the height of the thread varies, being both greater and smaller than the width measurements taken at the thread crest, depending upon the position at which the width measurement is taken.

21. The thread form of claim 15, wherein the threads have a given thread height and wherein the thread crest have a given width and wherein the width at or near the thread crests is greater than the width measured at any point along the height of the thread.

22. The thread form of claim 15, wherein the threads are cylindrical threads.

23. The thread form of claim 15, wherein the threads are formed with a negative sloped facet at the root of the stab flank.

24. The thread form of claim 23, wherein the thread facets form one hook on the load flank and two hooks on the stab flank, thereby providing improved performance in compression.

25. The thread form of claim 15, wherein the threads are tapered threads having a given angle of taper with respect to a longitudinal axis of the pipe, and wherein the thread crests are parallel to the thread angle of taper.

26. The thread form of claim 15, wherein the threads are tapered threads having a given angle of taper with respect to a longitudinal axis of the pipe, and wherein the thread roots and crests are parallel to the longitudinal axis of the pipe.

27. The thread form of claim 15, wherein the threads are helically structured as a wedge.

28. The thread form of claim 15, wherein the connection is used with a tubular selected from the group consisting of oil, gas, water and waste disposal well casing and tubing.

29. A make and break threaded pipe connection capable of being screwed together and subsequently unscrewed, the threaded pipe connection comprising:
a box having internal threads with stab flanks and load flanks and flat roots and crests and a pin having external threads with stab flanks and load flanks and flat crest and roots for mating with the mating internal threads of a box to make up a pipe connection, and wherein the stab flanks and load flanks each forms an inclined Z-shape in profile, the Z-shape profile including at least three separate facets with corresponding facets on the stab flank and corresponding facets on the load flank are all inclined in the same direction with respect to a horizontal axis of the pipe.

30. The make and break threaded connection of claim 29, wherein the connection is used with a tubular selected from the group consisting of casing and tubing for oil, gas, water and waste disposal wells.

* * * * *

UNITED STATES PATENT AND TRADEMARK OFFICE
CERTIFICATE OF CORRECTION

PATENT NO.         : 7,588,269 B2
APPLICATION NO.  : 11/527352
DATED              : September 15, 2009
INVENTOR(S)        : Kris L. Church It is certified that error appears in the above-identified patent and that said Letters Patent is hereby corrected as shown below:

Title page should be deleted and substitute therefor the attached title page.

IN THE DRAWINGS:

Delete informal Figures 1-8 and replace with attached formal Figures 1-8 as shown on the attached pages.

Signed and Sealed this

Twenty-fourth Day of November, 2009

David J. Kappos
*Director of the United States Patent and Trademark Office*

(12) United States Patent
Church

(10) Patent No.: US 7,588,269 B2
(45) Date of Patent: Sep. 15, 2009

(54) Z-SHAPED THREAD FORM FOR TUBULAR CONNECTIONS

(75) Inventor: Kris L. Church, Montgomery, TX (US)

(73) Assignee: Gaudy Technologies Corporation, Conroe, TX (US)

(*) Notice: Subject to any disclaimer, the term of this patent is extended or adjusted under 35 U.S.C. 154(b) by 528 days.

(21) Appl. No.: 11/527,352

(22) Filed: Sep. 26, 2006

(65) Prior Publication Data
US 2008/0073909 A1    Mar. 27, 2008

(51) Int. Cl.
F16L 25/00    (2006.01)
(52) U.S. Cl. .................... 285/334; 285/333; 285/390
(58) Field of Classification Search ............ 285/333, 285/334, 390
See application file for complete search history.

(56) References Cited
U.S. PATENT DOCUMENTS

| 4,022,205 | A | * | 5/1977 | Tenczar | 604/411 |
| 4,600,224 | A | * | 7/1986 | Blose | 285/334 |
| 4,600,225 | A | * | 7/1986 | Blose | 285/334 |
| 5,454,605 | A | * | 10/1995 | Mott | 285/333 |
| 6,254,146 | B1 | * | 7/2001 | Church | 285/334 |
| 6,722,706 | B2 | * | 4/2004 | Church | 285/334 |
| 6,832,789 | B2 | * | 12/2004 | Church | 285/333 |

* cited by examiner

*Primary Examiner*—David E Bochna
(74) *Attorney, Agent, or Firm*—Charles D. Gunter, Jr.

(57) ABSTRACT

A thread form is shown which is used to make a threaded pipe connection capable of being screwed together and subsequently unscrewed. A pin is provided having external threads with stab flanks and load flanks and flat crests and roots for mating with the mating internal threads of a box to make up a pipe connection. The stab flanks and load flanks form complex geometric profiles which in one version form an inclined Z-shape in profile and in another version form a reverse inclined Z-shape profile. Each profile includes at least three separate facets with the facets on the stab flank and the facets on the load flank both leaning in the same direction with respect to the longitudinal axis of the pipe, when viewed in profile.

30 Claims, 4 Drawing Sheets

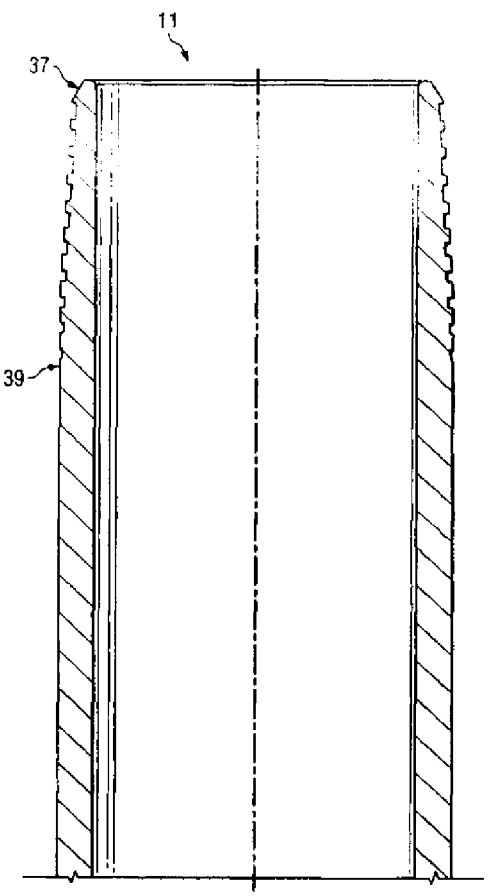

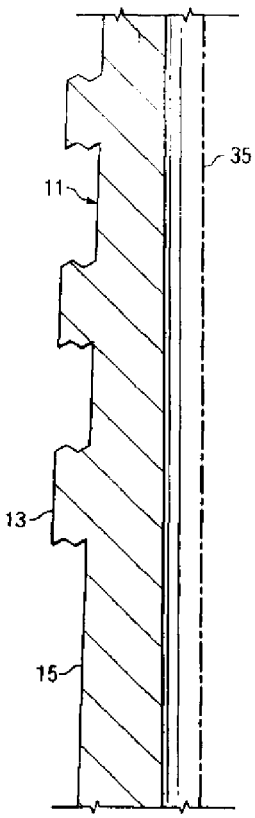

UNITED STATES PATENT AND TRADEMARK OFFICE
CERTIFICATE OF CORRECTION

PATENT NO. : 7,588,269 B2
APPLICATION NO. : 11/527352
DATED : September 15, 2009
INVENTOR(S) : Kris L. Church It is certified that error appears in the above-identified patent and that said Letters Patent is hereby corrected as shown below:

Title page should be deleted and substitute therefor the attached title page.

IN THE DRAWINGS:

Delete informal Figures 1-8 and replace with attached formal Figures 1-8 as shown on the attached pages.

This certificate supersedes the Certificate of Correction issued November 24, 2009.

Signed and Sealed this

Fifteenth Day of December, 2009

David J. Kappos
*Director of the United States Patent and Trademark Office*

United States Patent
Church

(10) Patent No.: US 7,588,269 B2
(45) Date of Patent: Sep. 15, 2009

(54) Z-SHAPED THREAD FORM FOR TUBULAR CONNECTIONS

(75) Inventor: Kris L. Church, Montgomery, TX (US)

(73) Assignee: Gandy Technologies Corporation, Conroe, TX (US)

(*) Notice: Subject to any disclaimer, the term of this patent is extended or adjusted under 35 U.S.C. 154(b) by 528 days.

(21) Appl. No.: 11/527,352

(22) Filed: Sep. 26, 2006

(65) Prior Publication Data
US 2008/0073909 A1    Mar. 27, 2008

(51) Int. Cl.
    *F16L 25/00* (2006.01)
(52) U.S. Cl. .................... 285/334; 285/333; 285/390
(58) Field of Classification Search .............. 285/333, 285/334, 390
    See application file for complete search history.

(56) References Cited

U.S. PATENT DOCUMENTS

| | | | | |
|---|---|---|---|---|
| 4,022,205 A | * | 5/1977 | Tenczar | 604/411 |
| 4,600,224 A | * | 7/1986 | Blose | 285/334 |
| 4,600,225 A | * | 7/1986 | Blose | 285/334 |
| 5,454,605 A | * | 10/1995 | Mott | 285/333 |
| 6,254,146 B1 | * | 7/2001 | Church | 285/334 |
| 6,722,706 B2 | * | 4/2004 | Church | 285/334 |
| 6,832,789 B2 | * | 12/2004 | Church | 285/333 |

* cited by examiner

*Primary Examiner*—David E Bochna
(74) *Attorney, Agent, or Firm*—Charles D. Gunter, Jr.

(57) ABSTRACT

A thread form is shown which is used to make a threaded pipe connection capable of being screwed together and subsequently unscrewed. A pin is provided having external threads with stab flanks and load flanks and flat crests and roots for mating with the mating internal threads of a box to make up a pipe connection. The stab flanks and load flanks form complex geometric profiles which in one version form an inclined Z-shape in profile and in another version form a reverse inclined Z-shape profile. Each profile includes at least three separate facets with the facets on the stab flank and the facets on the load flank both leaning in the same direction with respect to the longitudinal axis of the pipe, when viewed in profile.

30 Claims, 6 Drawing Sheets